(12) United States Patent
Lee et al.

(10) Patent No.: US 7,631,016 B2
(45) Date of Patent: Dec. 8, 2009

(54) PROVIDING THE LATEST VERSION OF A DATA ITEM FROM AN N-REPLICA SET

(75) Inventors: Ken Lee, San Jose, CA (US); Sameer Joshi, San Jose, CA (US); Alok K. Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 11/124,456

(22) Filed: May 4, 2005

(65) Prior Publication Data

US 2006/0253504 A1 Nov. 9, 2006

(51) Int. Cl.
G06F 17/30 (2006.01)
G06F 15/16 (2006.01)

(52) U.S. Cl. .............. 707/201; 707/200; 707/202; 707/203; 707/8; 707/100; 714/4; 714/6

(58) Field of Classification Search ........... 707/201, 707/202, 203, 8; 715/511; 717/120–123; 714/4, 6
See application file for complete search history.

(56) References Cited

U.S. PATENT DOCUMENTS

| | | | |
|---|---|---|---|
| 5,740,348 A * | 4/1998 | Cunliffe et al. ............... | 714/6 |
| 5,909,540 A * | 6/1999 | Carter et al. .................. | 714/4 |
| 6,298,419 B1 | 10/2001 | Kontothanassis et al. | |
| 6,542,929 B1 * | 4/2003 | Briskey et al. .............. | 709/223 |
| 6,553,389 B1 * | 4/2003 | Golding et al. ............. | 707/202 |
| 6,950,833 B2 | 9/2005 | Costello et al. | |
| 6,993,523 B1 * | 1/2006 | Mende, Jr. .................... | 707/8 |
| 7,152,076 B2 * | 12/2006 | Sundararajan et al. ...... | 707/203 |
| 7,197,632 B2 | 3/2007 | Rao et al. | |
| 7,266,722 B2 | 9/2007 | Kingsbury | |
| 2003/0079155 A1 | 4/2003 | Kingsbury | |
| 2003/0167322 A1 | 9/2003 | Butterworth et al. | |
| 2003/0221149 A1 | 11/2003 | Vollrath | |
| 2005/0125461 A1 | 6/2005 | Filz | |
| 2007/0022138 A1 | 1/2007 | Erasani et al. | |
| 2007/0022314 A1 | 1/2007 | Erasani et al. | |
| 2007/0078911 A1 * | 4/2007 | Lee et al. .................... | 707/204 |
| 2008/0005196 A1 | 1/2008 | Beck | |

OTHER PUBLICATIONS

David K. Gifford, Weighted Voting for Replicated Data, (Stanford University and Xerox Palo Alto Research Center, 1979) pp. 150-162.*

(Continued)

*Primary Examiner*—Tony Mahmoudi
*Assistant Examiner*—Dennis Truong
(74) *Attorney, Agent, or Firm*—Hickman Palermo Truong & Becker LLP; Brian D. Hickman

(57) ABSTRACT

Less-restrictive techniques are provided for ensuring that replicated-data systems will never provide out-of-date version of data items. A replicated-data system maintains a version number, a membership group identifier, and a membership count, with each replica of a data item. These values are maintained in such a way as to allow the replicated-data system to reliably satisfy some read requests even though half, or less than half, of the replicas of the data item are available.

18 Claims, 4 Drawing Sheets

OTHER PUBLICATIONS

Chin-Min Lin, Ge-Ming Chiu, IEEE Comuter Society, and Cheng-Hong Cho, A New Quorum-Based Scheme for Managing Replicated Data n Distributed Systems, (IEEE Transactions on Computers, Dec. 2002; vol. 51, No. 12).*

Amir, Yair, et al., "From Total Order to Database Replication," Department of Computer Science, Johns Hopkins University, Technical Report CNDS-2001-6, Nov. 5, 2001, pp. 1-26.

Wiesmann, M. et al., "Understanding Replication in Database and Distributed Systems," Operating Systems Laboratory, Swiss Federal Institute of Technology, retrieved from the internet at <ttp://lsewww.epfl.ch/Documents/html/WPS+99.html>, retrieved on Nov. 8, 2005, 24 pages.

Computer Technology Documentation Project, "Active Directory Replication," retrieved from the internet at <ttp://www.comptechdoc.org/os/windows/win2k/win2kadrepl.html>, retrieved on Nov. 4, 2005, 7 pages.

Oracle Corporation, "Understanding Replication," Oracle8i Replication, Release 8.1.5, Chapter 1, 1999, retrieved from the internet at <http://www.csee.umbc.edu/help/oracle8/server.815/a67791/ch1.htm>, retrieved on Nov. 4, 2005, 12 pages.

Pedone, Fernando, et al., "On Transaction Liveness in Replicated Database", Ecole Polytechnique Federale de Lausanne, Departemen d' Informatique, CH-1015, Switzerland, 1997, retrieved from website <www.inf.unisi.ch/faculty/pedone/papers.html >, 6 pages.

Wei, Yuan, et al., "Order: A Dynamic Replication Algorithm for Periodic Transactions in Distributed Real Time Database", Department of Computer Science, University of Virginia, Aug. 25-27, 2004, retrieved from website <www.cs.virginia.edu/~yw3f/html/research.html>, 18 pages.

* cited by examiner

C1 — VERSION: 3
MEMBERSHIP GROUP IDENTIFIER:M22
MEMBERSHIP COUNT: 4

C2 — VERSION: 3
MEMBERSHIP GROUP IDENTIFIER:M22
MEMBERSHIP COUNT: 4

C3 — VERSION: 3
MEMBERSHIP GROUP IDENTIFIER:M22
MEMBERSHIP COUNT: 4

C4 — VERSION: 3
MEMBERSHIP GROUP IDENTIFIER:M22
MEMBERSHIP COUNT: 4

FIG. 1

C1
VERSION: 4
MEMBERSHIP GROUP IDENTIFIER:M23
MEMBERSHIP COUNT: 3

C2
VERSION: 4
MEMBERSHIP GROUP IDENTIFIER:M23
MEMBERSHIP COUNT: 3

C3
VERSION: 3
MEMBERSHIP GROUP IDENTIFIER:M22
MEMBERSHIP COUNT: 4

C4
VERSION: 4
MEMBERSHIP GROUP IDENTIFIER:M23
MEMBERSHIP COUNT: 3

FIG. 2

PROVIDING THE LATEST VERSION OF A DATA ITEM FROM AN N-REPLICA SET

FIELD OF THE INVENTION

The present invention relates to replicated-data systems and, more specifically, to providing the latest version of a data item from an N-replica set.

BACKGROUND

A variety of conditions may cause a copy of a data item to become unavailable. For example, a copy of a data item will become unavailable if the storage device on which the copy resides crashes. Similarly, the copy will become unavailable if the node that has access to the storage device on which the copy resides crashes.

If only one copy of a data item exists, then the data item will become unavailable if that one copy of the data item becomes unavailable. Therefore, to increase the availability of a data item, copies of the data item may be maintained on multiple storage devices accessible to multiple nodes. Systems that maintain multiple copies of data items in this manner are referred to herein as "replicated-data systems". Each copy of the data item is referred to herein as a "replica" of the data item. The replicas of a data item are collectively referred to as the "replica set" of the data item.

Because replicas of the same data item are spread across multiple nodes in a replicated-data system, the current version of a data item may still be available within the replicated-data system even though one or more replicas of the data item are not available. For example, if each of five nodes in a replicated-data system has a replica of the current version of a data item, then the current version of the data item is available as long as any one of the five nodes is available.

Unfortunately, within a replicated-data system, it is not always possible to keep all replicas of a data item up-to-date. For example, when an update is performed to a data item, some replicas of the data item may not be available. Under these circumstances, only those replicas that are available are updated, and the unavailable replicas become out-of-date. When the out-of-date replicas become available, those replicas continue to reflect an out-of-date state of the data item. Therefore, at any given time, some of the available replicas of a data item may be "current", while other available replicas of the same data item are out-of-date.

When a request for a data item is received by a replicated-data system, it is not safe for the replicated-data system to satisfy the request with any available replica of the data item, since some or all available replicas of the data item may be out-of-date. Therefore, replicated-data systems need some mechanism for determining which available replicas of the data item represent the current state of the data item.

One prior technique used by replicated-data systems to ensure that requests for a data item are satisfied with the current version of the data item involves conforming to the following rules:

To Update to the Data Item:
  any update must be written to at least 50% of the total replicas in a replica set
  an integer, called "version number", is increased by one for each update
  the version number for the update is stored with each updated replica
  storing the version number with an updated replica is performed atomically relative to the update of the replica To Read the Current Version of the Data Item:
  more than 50% of the total replicas in a replica set must be accessible for reading
  the available replica with the largest version number is used to satisfy requests For example, assume that a replicated-data system maintains six replicas of a particular data item. Assume that, initially, all six replicas are current, and the current Version Number is 3. If an update occurs when three of those replicas are available, then the Version Number will be incremented to 4, and the update will be made to the three available replicas. Note that, based on the rules identified above, no update would be possible if four or more of the replicas were unavailable. After the update is made to the three available replicas, those three replicas will specify Version Number 4, while the three replicas that were unavailable will still specify Version Number 3.

Assume that, at this point, the replicated-data system receives a request to read the current version of the data item. If three or more of the replicas are not available at the time of the request, then the replicated-data system cannot satisfy the request. However, if four or more of the replicas are available, then the replicated-data system inspects all of the available replicas, and identifies the highest version number among the replicas. In this example, the highest version number would be 4. Because the replicated-data system has complied with the rules specified above, the four or more available replicas are guaranteed to include at least one replica associated with the current version (version number 4). The replicated-data system then answers the request with the value of a replica that is associated with Version Number 4.

While conformance with the rules specified above guarantee that the replicated-data system will never provide out-of-date data items, it places relatively severe restrictions on when requests can be answered. Specifically, requests for a data item cannot be answered unless more than half of the replicas of the data item are available. If half or fewer of the replicas are available, a request for the current version of the data item cannot be answered even though one or more of the available replicas may be the current version of the data item.

Based on the foregoing, it would be desirable to provide less-restrictive techniques that still guarantee that a replicated-data system will never provide out-of-date versions of data items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating a replica set, in which membership group identifiers and membership counts are stored with each replica according to an embodiment of the invention;

FIG. 2 is a block diagram illustrating the replica set of FIG. 1 after an update has been performed;

DETAILED DESCRIPTION

Figure 3:
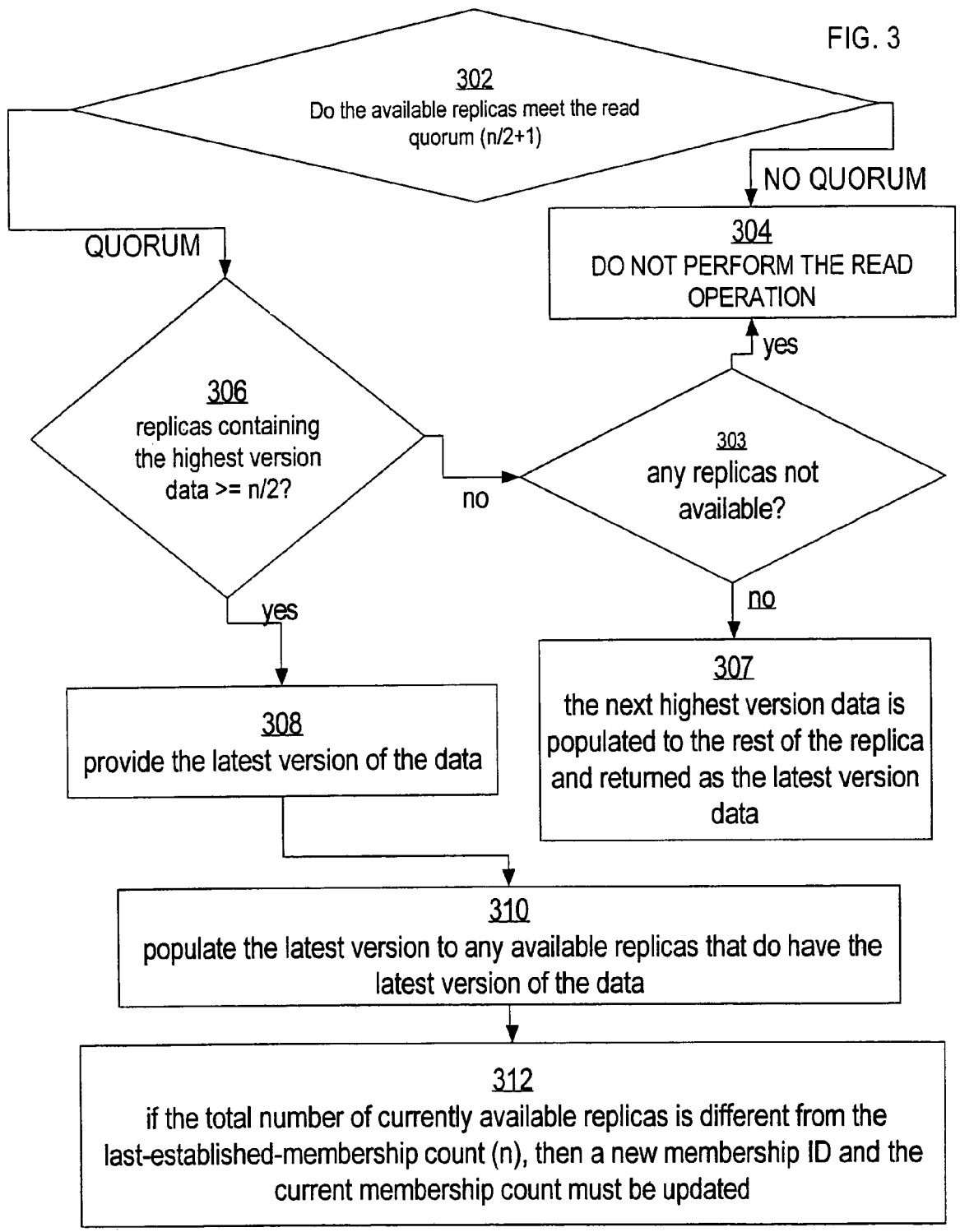
FIG. 3 is a flowchart illustrating steps for performing a read operation in a replicated-data system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Less-restrictive techniques are provided for ensuring that replicated-data systems will never provide out-of-date data versions of items. According to one embodiment, the techniques involve maintaining (1) a version number, (2) a membership group identifier, and (3) a membership count, with each replica of a data item. As shall be described in greater detail hereafter, these values are maintained in such a way as to allow the replicated-data system to identify circumstances where read requests may be satisfied even though half, or less than half, of the replicas of the data item are available.

Membership Group Identifiers

According to one embodiment, a membership group identifier is stored with each replica of a data item, in addition to the version number of the data item. The membership group identifier associated with a replica indicates the most recent "active group" to which the replica belonged. As used herein, the term "active group" refers to the group of replicas that are updated during an update.

While the version number of the data item is incremented every time the data item is updated, the membership group identifier is only updated when, at the time of an update to the data item, the membership of the active group has changed since the previous update.

For example, consider a replicated-data system that maintains four replicas (c1, c2, c3 and c4) of a particular data item, as illustrated in FIG. 1. All four replicas were updated during the most recent update. Consequently, all four replicas are associated with the same version number (version 3) and the same membership group identifier (M22).

If all four replicas are updated again, the version number would change but the membership group identifier would not change, since the membership of the active group would not have changed since the previous update. On the other hand, if only three of the replicas are available during the next update, then during the update a new membership group identifier (M23) is generated and stored with the three updated replicas. At this point, the unavailable replica will continue to be associated with membership group identifier M22, while the available replicas are associated the new membership group identifier M23. FIG. 2 is a block diagram that illustrates the four replicas of FIG. 1 after such an update, where replica c3 was not available during the update.

According to one embodiment, each group identifier has a unique value relative to the prior group identifiers used for the same data item. However, in one embodiment, the group identifiers do not have values that reflect the order in which the corresponding active groups were updated. Thus, the group identifier M2 may be associated with an update that occurred after an update that was associated with group identifier M33.

Membership Counts

According to one embodiment, a membership count is stored with each replica of a data item, in addition to the membership group identifier and the version number. The membership count that is stored with a replica indicates how many replicas belong to the membership group that is associated with the replica. According to one embodiment, the operations of (1) storing a membership group identifier with a replica, and (2) storing a membership count with a replica, are performed atomically relative to each other. Performing these updates as an atomic operation ensures that the membership count associated with a replica accurately indicates the number of members in the group indicated by the membership group identifier associated with that same replica.

In the examples given above, membership group M22 included four replicas, and M23 included three replicas. Therefore, the membership count of membership group M22 is 4, while the membership count of membership group M23 is 3. Referring again to FIG. 1, the membership count 4 is associated with each of the four replicas that belong to membership group M22. In FIG. 2, the membership count 3 has been stored with the three replicas that belong to membership group M23, while replica c3 continues to identify membership group M22 and membership count 4.

Using the Membership Group ID and Count

The membership group identifiers and the membership count values allow a replicated-data system to reliably update and read data items under circumstances where such operations were not previously possible. According to one embodiment, the replicated-data system employs update and read rules that are less restrictive than those described above.

According to one embodiment, the less restrictive rules are: (1) updates can be performed as long as at least 50% of the replicas that belong to the most-recently-established membership group are available, and (2) reads can be performed as long as more than 50% of the total replicas in the most-recently-established membership group are available. Application of these rules shall be described in greater detail hereafter.

Less Restrictive Update Rule

As mentioned above, prior replicated-data systems only allow updates that can be written to at least 50% of the total replicas in a replica set. In contrast, replicated-data systems that use membership group identifiers and membership count values are able to perform updates based on the less restrictive rule: updates must be written to at least 50% of the replicas that belonged to the most-recently-established membership group.

A membership group is considered to have a quorum if the number of available replicas associated with the membership group is greater than half of the membership count of the membership group. When the above-specified rule is followed, it is not possible for any membership group other than the most-recently-established membership group to have a quorum. Specifically, each update that is performed for a new membership group does not leave enough members of the previous membership group to allow that previous membership group to form a quorum.

As an example of how the less restrictive update rule can be applied, consider the replicas illustrated in FIG. 2. Assume that the replicated-data system receives a request to update the data item to create a new version (version 5) of the data item. In response to the request, the replicated-data system attempts to update the available replicas, and determines whether the updated replicas include at least 50% of the most-recently-established membership group. If the updated replicas do not include at least 50% of the most-recently established membership group, then the update is rolled-back (undone), if possible. If the updated replicas include a quorum of a membership group, then that membership group must be the most-recently-established membership group, and the update succeeds.

According to one embodiment, when the replicated-data system attempts to update the replicas in the current membership group, the replicated-data system counts how many replicas were successfully updated. If all of the replicas in the most-recently-established membership group were updated, then the update does not have to be rolled back. In addition, no change needs to be made to the group membership identifier and the membership count of the updated data items.

On the other hand, if less than 50% of replicas in the most-recently-established replica group were updated, then the replicated-data system attempts to roll back the update. However, it is possible that the replicated-data system cannot roll back the update on some of the replicas, because they might have become unavailable after they were updated. In any case, the replica-data system must report that the update failed.

If not all of the replicas were updated, but at least 50% were updated, then the replicated-data system needs to update the new membership identifier and the membership count to those replicas. Again, some of the replicas may become unavailable. As long as the update containing the new membership identifier and membership count can be made to at least 50% of replicas, the replicated-data system can declare the update is successful. Since the write quorum requirement is met, but the membership has also changed, a new membership ID and the current membership count must be updated to each replica atomically. If every replica can be updated, then the replicated-data system is done and ready for next read/write operation. If less than n/2 of the replicas can be updated, then the replicated-data system must stop any further update operation until at least n/2 of the replicas can be updated. If at least n/2 of the replicas can be updated, replicated data system should repeat this step because the membership has changed.

On the other hand, if less than 50% of replicas are updated with the new membership identifier and membership count, then the replicated-data system has to declare the update is successful because the replicated-data system has updated some replicas (and cannot undo them) and must stop any further read/write operation to the entire replica set until the every copy of the replica in the entire replica set becomes available and the data with the highest version (regardless what membership identifier is associated) is populated to the remaining replicas.

In the example illustrated in FIG. 2, the most-recently-established membership group is membership group m23. There are three members in membership group m23. Therefore, in order to perform the update, at least two members of membership group m23 need to be involved in the update. As long as two members of membership group m23 are available for the update, the update may be performed regardless of whether any other replicas are also available for update. Thus, even if c1 and c2 are the only available replicas, the update may still be performed.

The specific technique used to ensure that the update rule is satisfied may vary from implementation to implementation, and the description given above is merely one example of how a replicated-data system may perform an update. For example, assume that an update is made to less than 50% of the replicas. Rather than declaring such updates a failure and rolling back the update, the replicated-data system may declare such updates a success, and then stop any further read/write operation to the entire replica set until every copy of the replica in the entire replica set becomes available, and the data with the highest version is populated to the remaining replicas.

Less Restrictive Read Rule

When membership groups are used, the rule that "more than 50% of the total replicas in the entire replica set need to be accessible for reading the data item" need not be enforced by the replicated-data system. Instead, the replicated-data system counts how many replicas, within the most-recently-established membership group, contain the highest version of the data. If the count turns out to be equal to or more than n/2 (where n is the number of replicas in the most-recently-established membership group), then the highest version data item is returned as the latest data item.

If that count is less than n/2, then the replicated-data system determines whether any replicas in the most-recently-established membership group are not available. If any replicas in the most-recently-established membership group are not available, then the replicated-data system cannot determine the highest version data was successfully written to n/2 replicas or more. However, if every replica in the membership group is available to be examined, and the highest version data is written to less than n/2 of the replicas (the update quorum rule is not met), then the next highest version data is populated to the rest of the replica and be returned as the latest version data.

Because it is possible for more than n/2 replicas, within the most-recently-established membership group, to contain the highest version of the data item, even though less than 50% of the entire replica set are accessible, a replicated-data system that employs the techniques described herein is able to provide the current version of the data item under circumstances in which prior replicated-data systems cannot.

For example, consider the scenario illustrated in FIG. 2. There are four replicas in the replica set, so under the rules used by prior systems, at least three of the four replicas would have to be available before the system could guarantee access to the current version of the data item. In contrast, using the less restrictive rule described above, a replicated-data system would be able to provide the current version of the data item as long as any two available replicas from membership group M23 contain the highest version of the data item.

For example, assume that only replicas c1 and c4 are available at the time the data item is requested. The replicated-data system would read replicas c1 and c4. Based on the information stored with c1, the replicated-data system knows that the membership group M23 has three members. Because M23 has three members, the replicated-data system knows that M23 is the most-recently-established membership group if two or more members of M23 are available. In the present scenario, both c1 and c4 are members of M23. Therefore, the replicated-data system knows that M23 is the most-recently-established membership group.

The replicated-data system then inspects the version numbers associated with all available members of M23. If more than n/2 of those replicas are associated with the highest version number, then the replicated-data system selects and returns the value of the replica with the highest version number.

In this case, both c1 and c4 have the same version number. Because no other available member of the most-recently-established membership group has a higher version number, the version number contained in c1 and c2 is the highest version number. Because two replicas of the most-recently-established membership group have the highest version number, and the most-recently-established membership group has three members, the replicated-data system is able to determine that it is safe to return the value of c1 and c2 as the current value of the data item.

When the Less Restrictive Read Rule Cannot be Satisfied

Using the update rules described above, it is possible for the replicated-data system to be in a state in which less than n/2 of the replicas were updated, but the replicated-data system could not roll back the update to some of the replicas. Under these conditions, there may be no subset of replicas in the entire replica set that can meet the read rule described above.

According to one embodiment, to recover from this state, the replicated-data system waits until the entire replica set becomes available. When the entire replica set is available, the highest version of the data, along with the new group membership ID and the membership count, are populated to the entire replica set and be returned as the latest version of the data.

Example Read Operation

FIG. 3 is a flowchart of a read operation, according to an embodiment of the invention. Referring to FIG. 3, at step 302, the replicated-data system verifies that the available replicas meet the read quorum (n/2+1) requirement by comparing the membership ID and the membership count. If the replicated-data system finds a set of replicas meeting this requirement, control proceeds to step 306. Otherwise, the read operation cannot be performed (step 304).

At step 306, within the set of replicas derived from step 302, the replicated-data system counts how many replicas contain the highest version data. If the number of replicas containing the highest version data is equal to or more than n/2, then the replicated-data system returns the highest version data as the latest data (step 308), and control proceeds to step 310. Otherwise, control proceeds to step 303.

At step 303, the replicated-data system determines whether any replicas in the most-recently-established membership group are not available. If any replicas in the most-recently-established membership group are not available, then the replicated-data system cannot determine the highest version data was successfully written to n/2 replicas or more, and control passes to step 304. However, if every replica in the membership group is available to be examined, and the highest version data is written to less than n/2 of the replicas (the update quorum rule is not met), then the next highest version data is populated to the rest of the replica and be returned as the latest version data (step 307).

At step 310, since the replicated-data system can positively determine the highest version data is the latest data, the replicated-data system populates this data to the rest of the available replicas that do not have this data. This step is optional, since all available replicas might have already contained the highest version data. Control then proceeds to step 312.

At step 312, if the total number of currently available replicas is different from the last-established-membership count (n), then a new membership ID and the current membership count must be updated to each replica atomically since the membership has changed. If every replica can be updated, then the replicated-data system is done and ready for next read/write operation. If less than n/2 of the replicas can be updated, then the replicated data system must stop any further update operation until at least n/2 of the replicas can be updated. If at least n/2 of the replicas can be updated, then the replicated-data system should repeat this step 312, since the write quorum requirement is met but the membership has also changed.

Alternative Percentages

In the embodiments described above, each update had to be made to more than 50% of the members of the most-recently-established membership group, and each read had to be performed on at least 50% of the members of the most-recently-established group. However, in alternative embodiments, these percentages may vary, so long as the percentages guarantee that there is at least one overlap member between the percentage of members that were updated, and the percentage of members that were read.

Thus, the update rule may be that at least "x %" of the most-recently-established membership group is updated, as long as the read rule is that more than "(100-x) %" of the most-recently-established membership group is read. For example, the techniques described herein may be used with rules (1) for updates, at least 30% of the most-recently-established membership group must be updated, and (2) for reads, more than 70% of the most-recently-established membership group must be read.

Alternatively, in an embodiment where updates are rare, the techniques may be used with the rules (1) for updates, at least 70% of the most-recently-established membership group must be updated, and (2) for reads, more than 30% of the most-recently-established membership group must be read. Such an embodiment is able to attain a less-restrictive read rule, at the cost of using a more-restrictive update rule.

Rejoining the Membership Group

When an offline replica comes online, it is desirable for this replica to rejoin its corresponding membership group, thereby increasing the number of online replicas of the corresponding data item. According to one embodiment, when an offline replica comes online, the latest copy of the data item is populated to the replica before the replica is established as a member of the most-recently-established membership group. Once the latest copy of the data item is populated to the replica, the replica is available to receive subsequent updates to the data item.

In response to the addition of the newly available replica, the membership count of all available members of the most-recently-established membership group is updated. According to one embodiment, the change in membership of the most-recently-established membership group also triggers the generation of a new membership group identifier, which is stored in association with all replicas that were updated with the new membership count.

Hardware Overview

Figure 4:
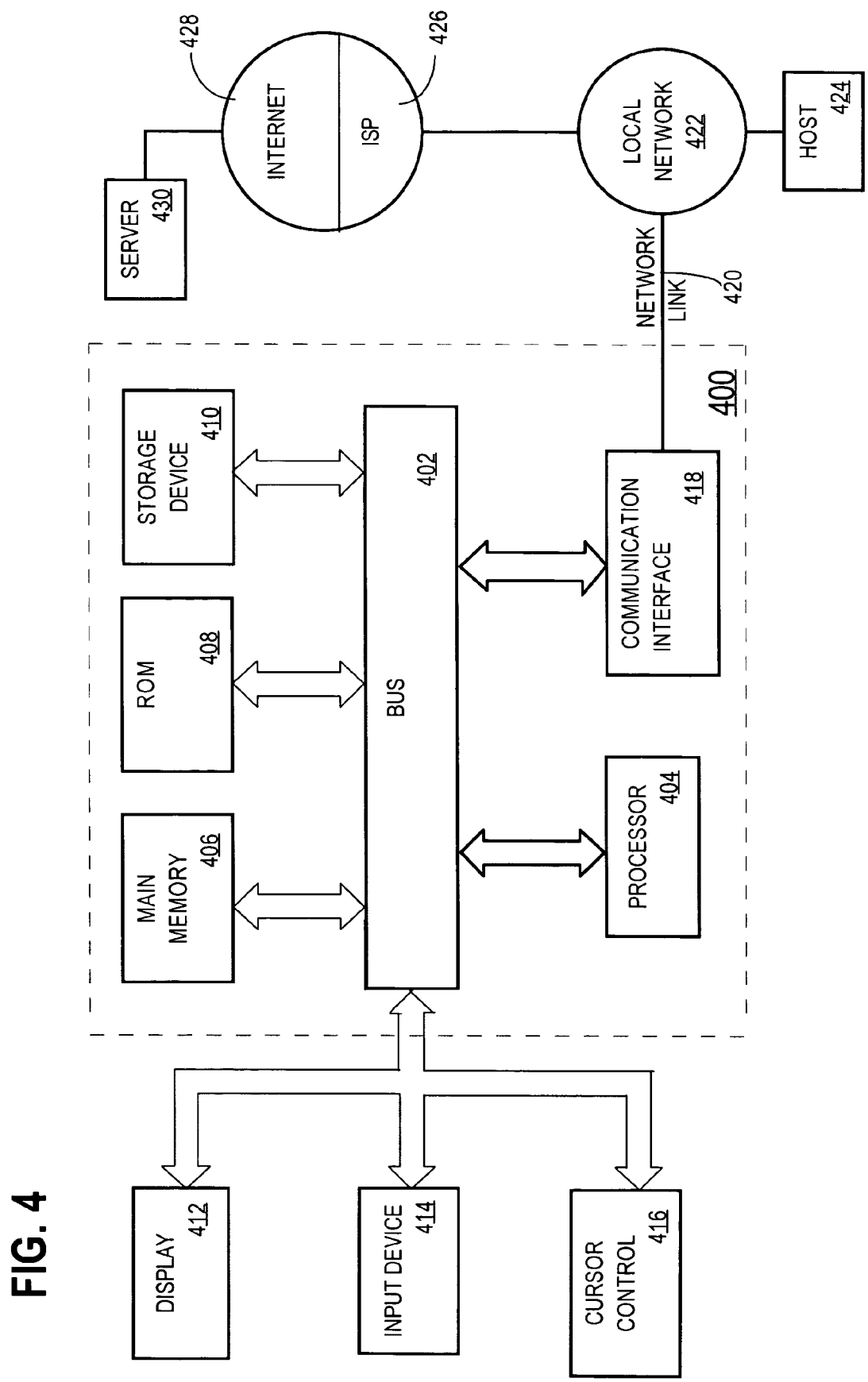
FIG. 4 is a block diagram illustrating a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing replicas of a data item, the method comprising the computer-implemented steps of:
   responding to a request to update the data item by
      initiating an update operation to replicas of the data item;
      determining whether at least a first predetermined percentage of members of a most-recently-established membership group were updated in the update operation, wherein the most-recently-established membership group includes those replicas that were updated in a most recent prior update to the data item; and
      in response to determining that (a) at least the first predetermined percentage of the members of the most-recently-established membership group were updated in the update operation, and (b) all members of the most-recently-established membership group were not updated in the update operation, establishing the replicas of the data item that were updated in the update operation as a new membership group that replaces the most-recently-established membership group; and
   responding to a request to read the data item by
      initiating a read operation on replicas of the data item;
      determining a second predetermined percentage based on determining a difference between one hundred percent and the first predetermined percentage of the most-recently-established membership group;
      determining whether more than the second predetermined percentage of the members of the most-recently-established membership group were read in the read operation;
      if more than the second predetermined percentage of the members of the most-recently-established membership group (a) were read in the read operation and (b) contained a most recent version associated with the data item, then determining a current version of the data item based on the members of the most-recently-established membership group that were read in the read operation; and
   wherein the method is performed by one or more computing devices.

2. The method of claim 1 wherein:
   if (a) all members of the most-recently-established membership group were read in the read operation, and (b) less than the second predetermined percentage of members of the most-recently-established membership group contain a most recent version associated with the data item, then performing the steps of:
      populating the next highest version data to the replicas of the most-recently-established membership group that do not currently have the next highest version data, and
      returning the next highest version of the data item as the latest version of the data item.

3. The method of claim 1 further comprising:
   storing, in association with each replica of the data item, a membership group identifier and a membership count;
   wherein the membership group identifier of a replica indicates the membership group to which the replica belongs; and
   wherein the membership group count of a replica indicates how many replicas belong to the membership group to which the replica belongs.

4. The method of claim 3 wherein the step of determining whether more than the second predetermined percentage of the members of the most-recently-established membership group were read in the read operation is performed by:
   reading the membership group identifiers and membership counts associated with all replicas that were read; and
   determining, based on the membership group identifiers and membership counts, whether more than the second predetermined percentage of the members of the most-recently-established membership group were read.

5. The method of claim 3 wherein the step of determining whether the first predetermined percentage of the members of the most-recently-established membership group were updated in the update operation is performed by:
   reading the membership group identifiers and membership counts associated with all replicas that were updated; and
   determining, based on the membership group identifiers and membership counts, whether the first predetermined percentage of the members of the most-recently-established membership group were updated in the update operation.

6. The method of claim 1 further comprising causing the request to read the data item to fail if more than the second predetermined percentage of the members of the most-recently-established membership group were not read in the read operation.

7. The method of claim 1 further comprising:
   when a previously-offline replica of a data item comes online, populating a latest copy of the data item to the replica;
   adding the replica as a member of the most-recently-established membership group; and
   in response to the addition of the previously-offline replica to the most-recently-established membership group, updating a membership count of all available members of the most-recently-established membership group.

8. The method of claim 7 wherein the change in membership of the most-recently-established membership group triggers generation of a new membership group identifier, which is stored in association with all replicas that were updated with the new membership count.

9. A computer-readable storage medium storing one or more sequences of instructions which, when executed by one or more processors, causes the one or more processors to perform the method recited in claim 1.

10. A computer-readable storage medium storing one or more sequences of instructions which, when executed by one or more processors, causes the one or more processors to perform the method recited in claim 2.

11. A computer-readable storage medium storing one or more sequences of instructions which, when executed by one or more processors, causes the one or more processors to perform the method recited in claim 3.

12. A computer-readable storage medium storing one or more sequences of instructions which, when executed by one or more processors, causes the one or more processors to perform the method recited in claim 4.

13. A computer-readable storage medium storing one or more sequences of instructions which, when executed by one or more processors, causes the one or more processors to perform the method recited in claim 5.

14. A computer-readable storage medium storing one or more sequences of instructions which, when executed by one or more processors, causes the one or more processors to perform the method recited in claim 6.

15. A computer-readable storage medium storing one or more sequences of instructions which, when executed by one or more processors, causes the one or more processors to perform the method recited in claim 7.

16. A computer-readable storage medium storing one or more sequences of instructions which, when executed by one or more processors, causes the one or more processors to perform the method recited in claim 8.

17. The method of claim 1 further comprising initiating roll back of the update operation if the first predetermined percentage of the members of the most-recently-established membership group were not successfully updated in the update operation.

18. A computer-readable storage medium storing one or more sequences of instructions which, when executed by one or more processors, causes the one or more processors to perform the method recited in claim 17.

* * * * *

UNITED STATES PATENT AND TRADEMARK OFFICE
CERTIFICATE OF CORRECTION

PATENT NO. : 7,631,016 B2  Page 1 of 1
APPLICATION NO. : 11/124456
DATED : December 8, 2009
INVENTOR(S) : Ken Lee et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 208 days.

On page 2, in column 1, under "Other Publications", line 1, delete "Comuter" and insert -- Computer --, therefor.

Signed and Sealed this

Fourteenth Day of September, 2010

David J. Kappos
*Director of the United States Patent and Trademark Office*